United States Patent [19]

Harding et al.

[11] 4,373,232

[45] Feb. 15, 1983

[54] POULTRY CUTTING MACHINE

[75] Inventors: Robert R. Harding, Livingston; Walter L. Stuermer, Modesto, both of Calif.

[73] Assignee: Foster Poultry Farms, Livingston, Calif.

[21] Appl. No.: 229,154

[22] Filed: Jan. 28, 1981

[51] Int. Cl.³ .............................................. A22C 21/00
[52] U.S. Cl. ........................................................ 17/11
[58] Field of Search ..................................... 17/11, 52

[56] References Cited

U.S. PATENT DOCUMENTS

| | | | |
|---|---|---|---|
| 2,941,238 | 6/1960 | Reeves | 17/11 |
| 3,675,272 | 7/1972 | Schacht | 17/11 |
| 3,930,282 | 1/1976 | Martin et al. | 17/11 |
| 3,950,820 | 4/1976 | Duncan et al. | 17/11 |
| 4,184,229 | 1/1980 | Soran | 17/11 |

*Primary Examiner*—Willie G. Abercrombie

*Attorney, Agent, or Firm*—Huebner & Worrel

[57] ABSTRACT

A poultry cutting machine having a pair of downwardly convergent, horizontally elongated dorsal guides and a pair of elongated, upwardly convergent ventral guides parallel to the dorsal guides and defining therewith a path of travel along the guides for a poultry carcass positioned with the breast upwardly disposed and the backbone extended along the path, a pair of saws extending upwardly into the path between the dorsal guides in oppositely adjacent relation to the backbone, a single saw extending downwardly into the path between the ventral guides, and a stop disposed in the path, the saws and stop being spaced along the path so that a carcass manually moved therealong into engagement with the stop has the breast split longitudinally by the single saw while the pair of saws simultaneously sever the backbone from the rib cage, the thighs remaining attached to the backbone.

6 Claims, 7 Drawing Figures

POULTRY CUTTING MACHINE

BACKGROUND OF THE INVENTION

1. Field of the Invention

The present invention relates to a poultry cutting machine, and more particularly to such a machine for use with a picked and eviscerated poultry carcass to split the breast and to cut the portion of the backbone opposite the breast from the rib cage.

2. Description of the Prior Art

The prior art is replete with methods and machines for cutting carcasses to be used for food. These methods and machines are designed for utilization at a variety of stages in the processing of a carcass. However, insofar as is known to the applicants, there are no known methods or machines for making the initial cuts in a picked and eviscerated poultry carcass which is to be segmented into its separate parts so that like parts can be marketed together.

Initially, in segmenting a poultry carcass for this purpose, one cut is made centrally through the breast, splitting it longitudinally, and a pair of cuts are made substantially parallel to the one cut along opposite sides of the backbone from the neck end of the carcass nearly to the thigh joints. The prior art method of performing these cuts requires four operations, individually performed by four persons. One person hangs the carcass in a conveyor or the like, a second person splits the breast, and a third person and fourth person make the cuts along the backbone.

It is apparent that, when thousands of carcasses are processed hourly in a modern, large scale commercial poultry processing plate in an era of rising labor costs, the cost of labor to perform these cuts is relatively high. Further, the placement of the cuts in relation to the center line of the breasts and to the backbone necessarily varies from cut to cut and with the skill and attention of the individual performing the cuts.

A machine operated by one person which makes these three cuts simultaneously, rapidly, and accurately is recognized, therefore, as being highly advantageous.

PRIOR ART STATEMENT

Characterizing the closest prior art of which the applicants are aware and in compliance with 37 C.F.R. §1.97 and §1.98, attention is invited to the following patents, copies of which are enclosed together with Form PTO-1449.

Martin et al. U.S. Pat. No. 3,930,282, Jan. 6, 1976;
Duncan et al. U.S. Pat. No. 3,950,820, Apr. 20, 1976;
Soran U.S. Pat. No. 4,184,229, Jan. 22, 1980.

The Martin et al. U.S. Pat. No. 3,930,282 is believed relevant in its disclosure at column 4, lines 19-26, of a machine in which a portion of a poultry carcass is held between a rail and guide for cutting by a set of rotating circular knives.

The Duncan et al. U.S. Pat. No. 3,950,820 is believed relevant in its disclosure of a machine wherein a poultry carcass is advanced against a stop formed by rods 44, best shown in FIGS. 3, 4, 5, and 7, to position the carcass for subsequent cutting by circular knives 58.

The Soran U.S. Pat. No. 4,184,229 is believed relevant in its disclosure at column 17, lines 49-60, of a device in which a portion of a poultry carcass is guided by a prismatic slide in a path of movement therealong for cutting by circular saws.

SUMMARY OF THE INVENTION

Therefore, it is an object of the present invention of provide an improved poultry cutting machine.

Another object is to provide such a machine which splits the breast of a poultry carcass and simultaneously makes a pair of parallel cuts along the portion of the backbone opposite the breast, the pair of cuts being adjacent to and transversely opposite of the backbone.

Another object is to provide such a machine capable of operation by a single operator even if unskilled.

Another object is to provide such a machine wherein the split and the cuts are made rapidly and are accurately and uniformly positioned in relation to the carcass.

Another object is to provide such a machine which is adapted for use with carcasses of varying thicknesses between their respective dorsal and central sides.

Still further objects are to provide improved elements and arrangements thereof in a poultry cutting machine having the above objects and advantages which is dependable, economical, durable, and fully effective in accomplishing its intended purposes.

DESCRIPTION OF THE PREFERRED EMBODIMENT

Figure 1:
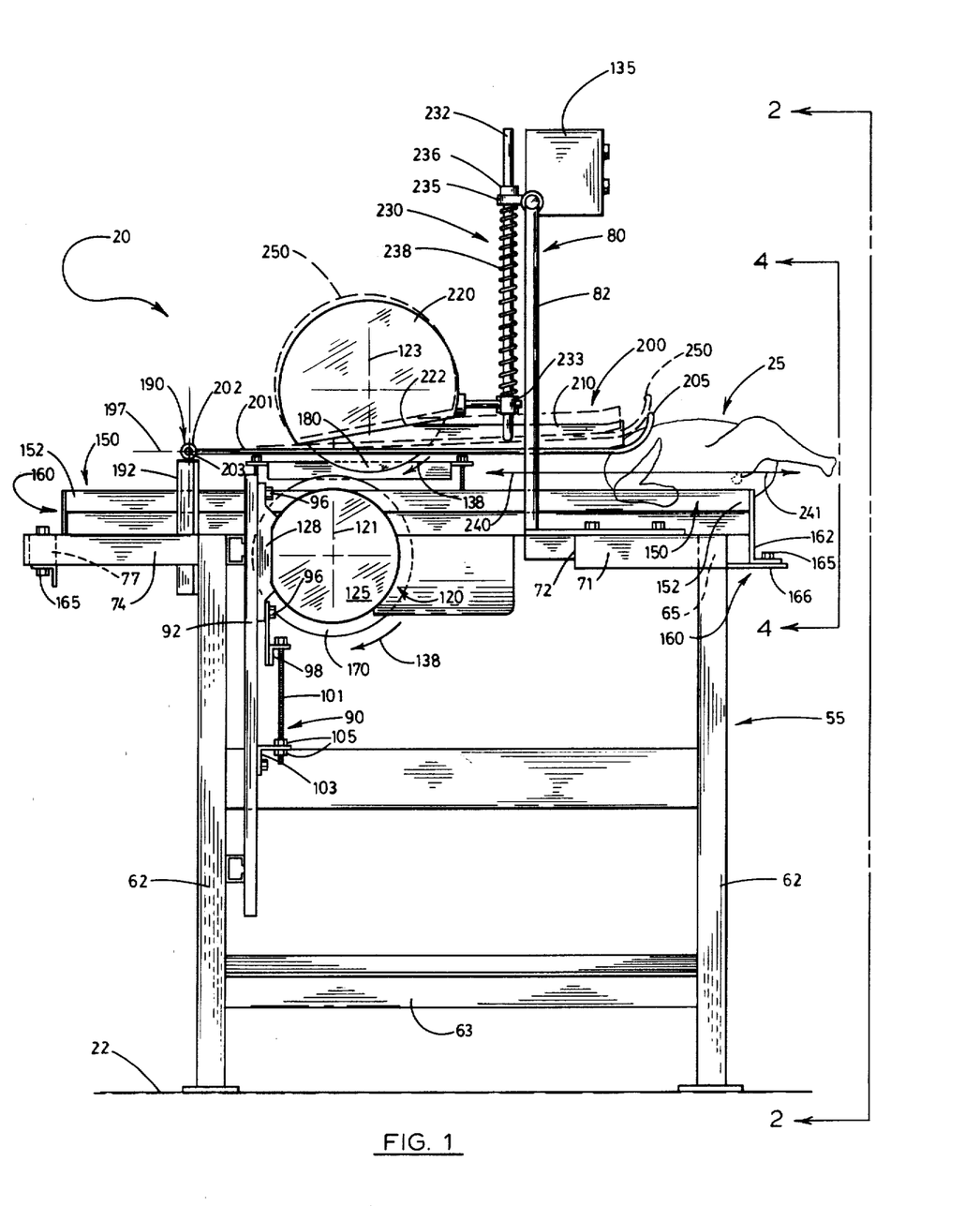
FIG. 1 is a side elevation of a poultry cutting machine embodying the principles of the present invention together with a poultry carcass being cut by the machine and depicted as superimposed thereon, an alternate position of guides of the machine being represented in dash lines.
Figure 2:
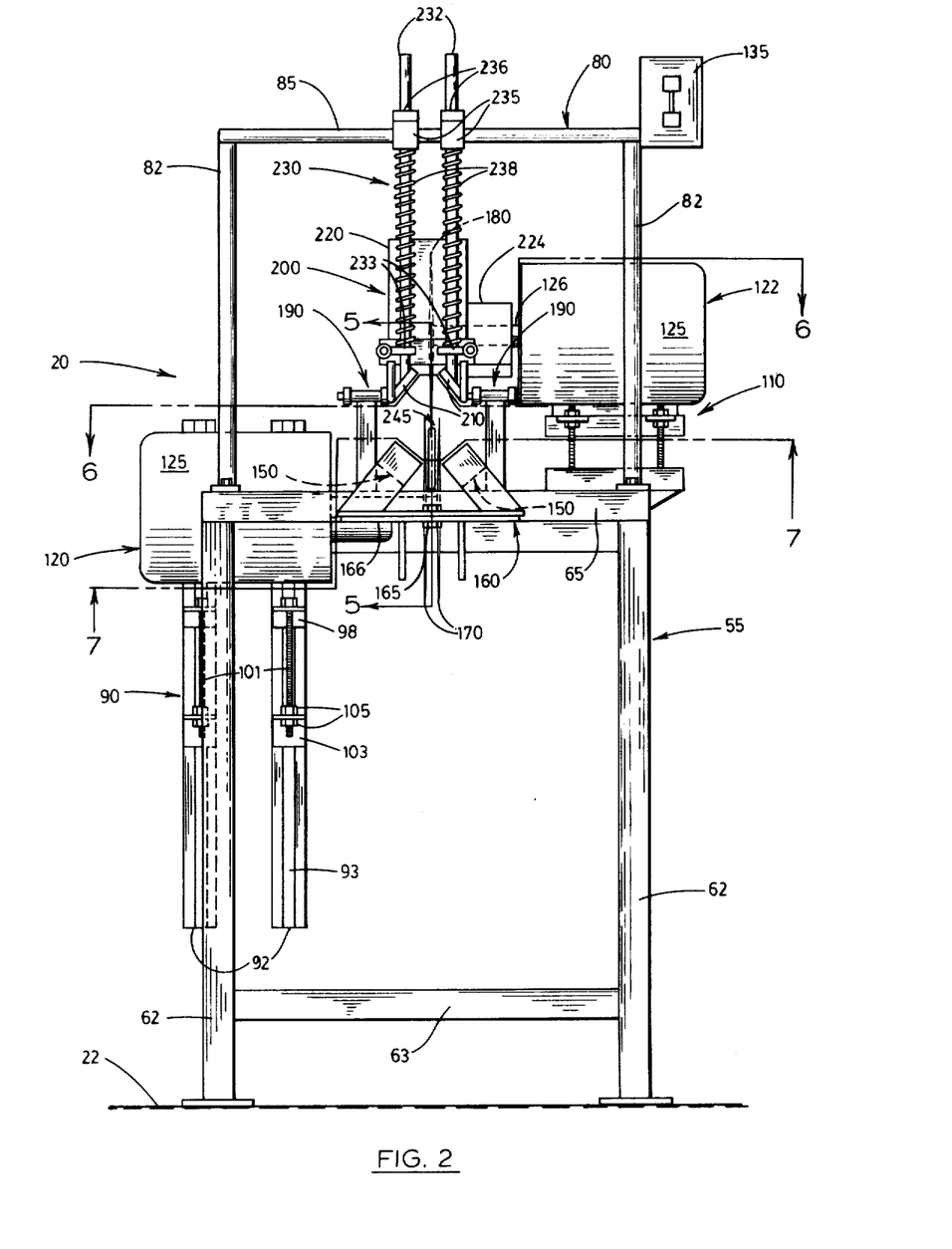
FIG. 2 is a front elevation of the machine taken from the position of line 2—2 of FIG. 1.
Figure 3:
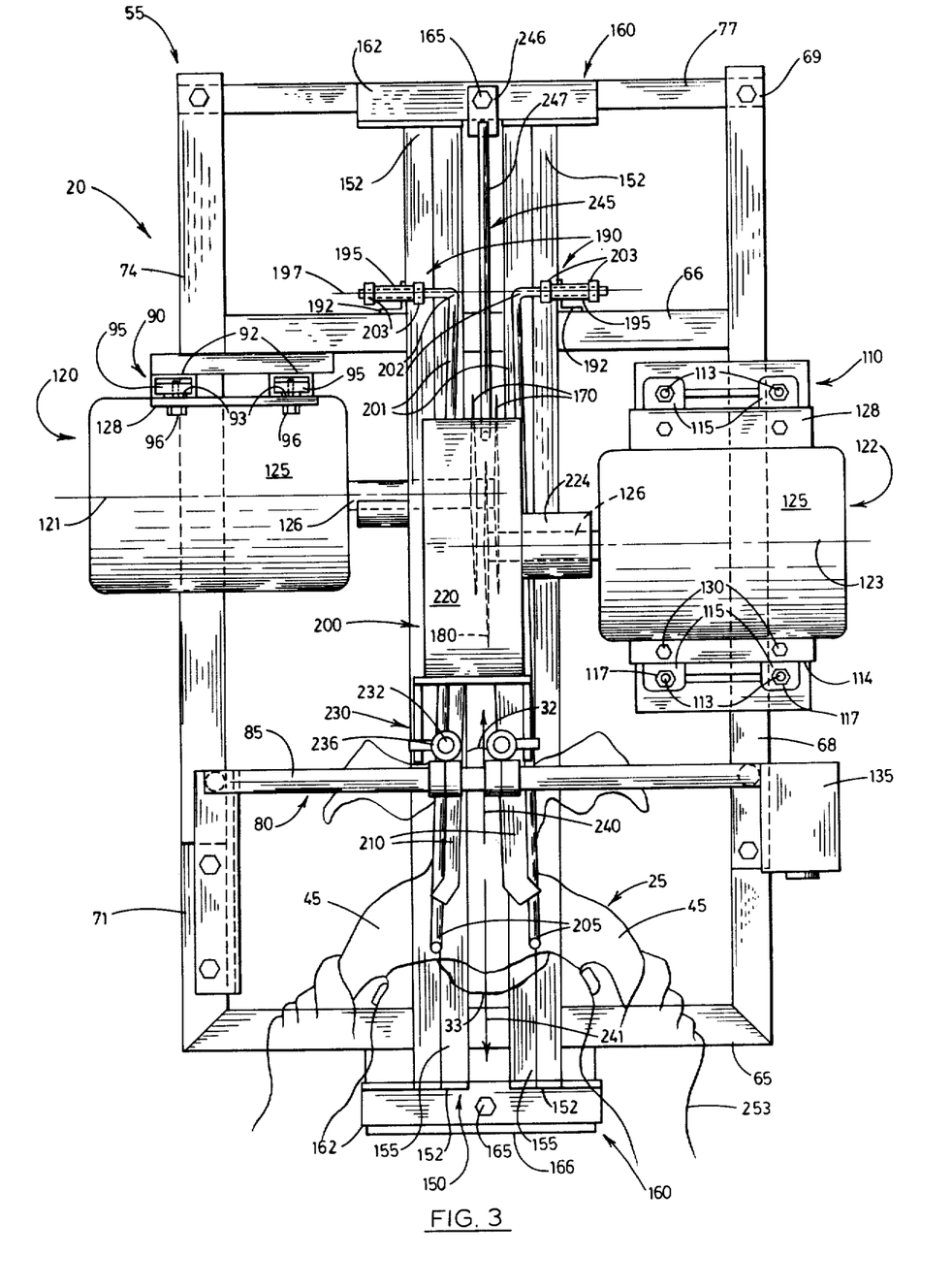
FIG. 3 is a top plan view of the machine together with a carcass in a position to be cut and hands of an operator of the machine grasping the carcass, the carcass and hands being depicted as superimposed on the machine.

Referring with greater particularity to the drawings, a poultry cutting machine 20 embodying the principles of the present invention is shown in FIGS. 1, 2, and 3. Typically, the machine is supported on a floor 22 of a poultry processing plant and is for use with a poultry carcass 25, best shown in FIGS. 4 through 7. The carcass is first picked and eviscerated and the head and feet removed in preparation for segmentation into separately marketable parts.

Figure 4:
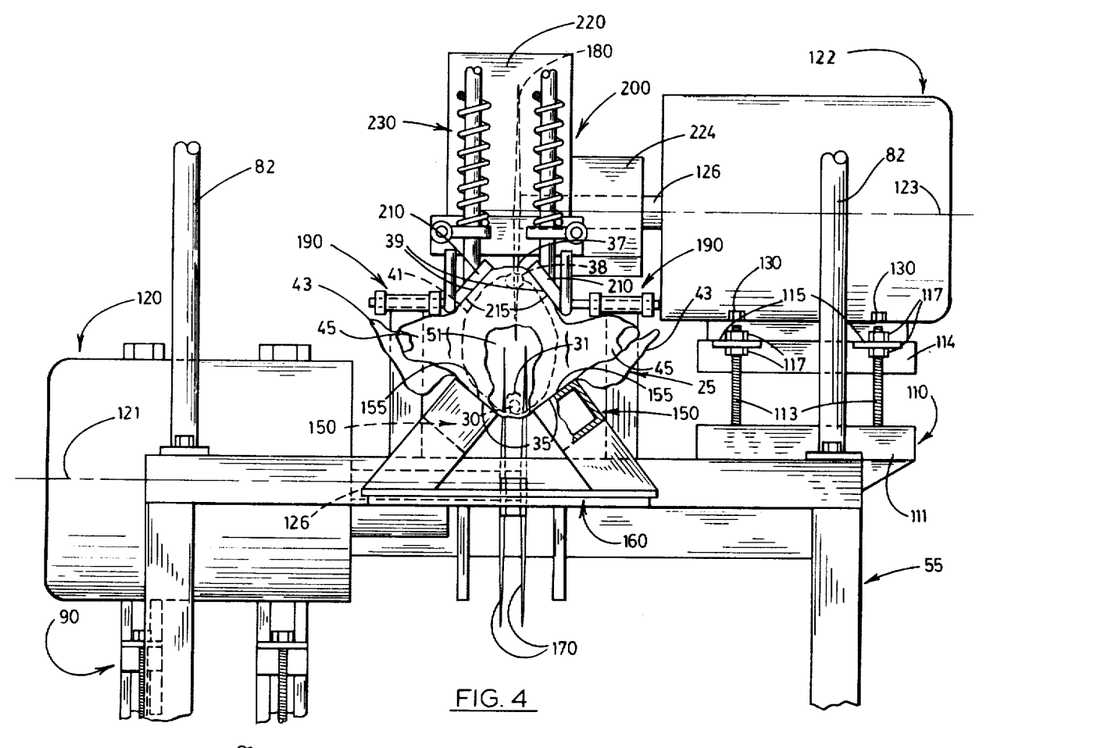
FIG. 4 is a fragmentary elevation of the machine together with the carcass taken from the position of line 4—4 of FIG. 1.
Figure 7:
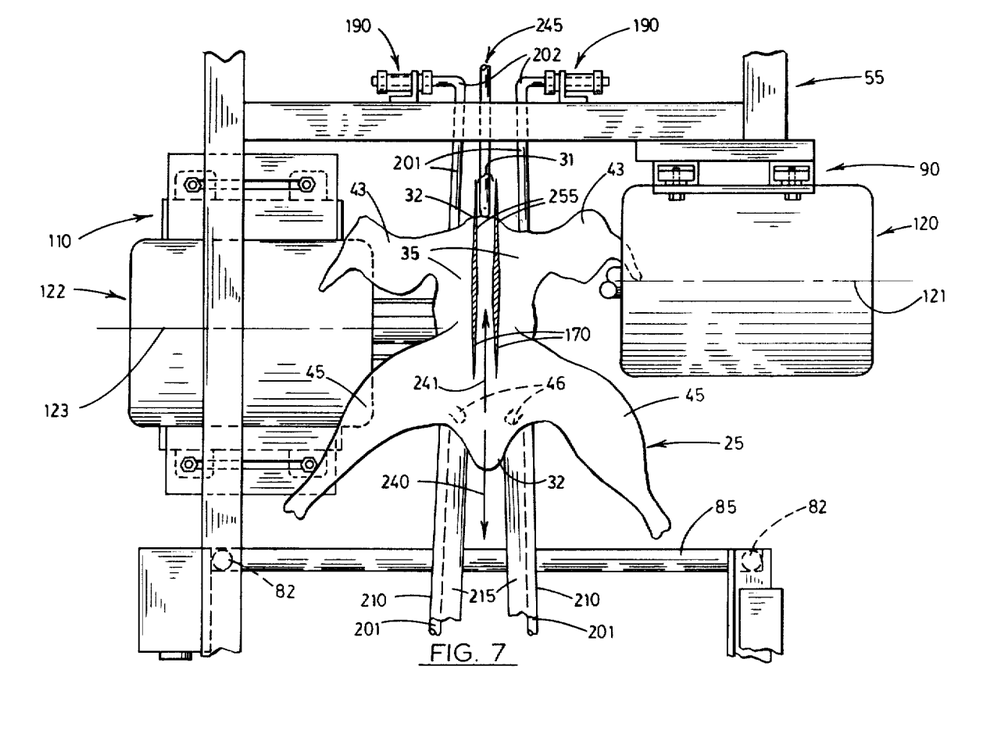
FIG. 7 is a fragmentary bottom plan view of the machine together with the carcass taken from the position of line 7—7 of FIG. 2.

The carcass 25 has an elongated backbone 30 of a lateral width, best shown in FIGS. 4 and 7 and indicated by the bracket 31 in FIG. 4. The backbone extends longitudinally of the carcass between its anterior or neck end 32 and its opposite posterior or tail end 33. As best shown in FIG. 4, the carcass has a lozenge-shaped transverse cross section with the backbone extending along one corner of the cross section between a pair of laterally spaced dorsal areas 35 disposed on the exterior of the carcass. The carcass has a breast 37 which is spaced from the backbone and includes a breast bone 38 disposed at the corner of the cross section opposite the backbone. The breast extends posteriorly from the neck end and bears a pair of ventral areas 39 disposed exteriorly of the carcass and laterally opposite of the breastbone. The breast and the backbone are connected by a rib cage 41 and are thus disposed oppositely thereof. The carcass has a pair of wings 43 connected to the backbone toward the neck end and a pair of thighs 45 connected to the backbone at individual joints 46. These joints are spaced a predetermined distance, indicated by the bracket 48 in FIG. 5, from the neck end. The breastbone terminates posteriorly of the neck end a distance approximately equal to this predetermined distance. The rib cage surrounds an anteriorly closed body cavity 51. The cavity opens posteriorly of the carcass between the tail end and the thighs and is thus disposed between the backbone and the breast.

Referring now to FIGS. 1, 2, and 3, it is seen that the machine 20 includes a frame, indicated generally by the numeral 55 and constructed of square tubular bars rigidly connected in any suitable manner in a generally rectangular parallelepiped configuration. Horizontally, the frame has an operator end, depicted as toward the left of FIG. 1 and toward the bottom of FIG. 3; an end longitudinally opposite the operator end; a right transverse side depicted as toward the right of FIG. 2 and toward the right of FIG. 3; and an opposite left transverse side. The frame has four vertical posts 62 disposed approximately at the corners of a square. Each post has a lower end rested on the floor 22 and an upper end disposed approximately at waist level. For rigidity, the posts are connected toward their lower ends by horizontal bars 63. The longitudinally corresponding pairs of upper ends of the posts are individually connected by a pair of transverse horizontal bars 65 and 66, respectively, a first such bar disposed toward the operator end of the frame and a second such bar disposed at the opposite end. The right-hand pair of such ends are connected by a right-hand longitudinal bar 68 which extends across these ends and substantially beyond the second bar terminating at an end 69. The upper end of the left hand post at the operator end of the frame is provided with a horizontal longitudinal bar 71 mounted in cantilevered relation thereon. This longitudinal bar extends toward the second transverse bar and terminates at an end 72 disposed centrally between the lefthand posts. The frame includes a longitudinal bar 74 aligned with the bar 71 and extended outwardly from the second bar and oppositely of the operator end to an end aligned transversely with the end 69. These latter two ends are interconnected by a horizontal transverse bar 77 which is spaced oppositely of the second bar from the first bar.

The frame 55 is provided with a rectangular arch, indicated generally by the numeral 80, disposed upwardly of the posts 62 and centrally longitudinally of the frame 55. The arch has a pair of transversely opposite, upright columns 82 spaced a distance equal to transverse spacing of the posts and having lower ends provided with individual brackets, one of the brackets being mounted on the end 72 and the other being mounted centrally on the bar 68. The upper ends of the columns are interconnected by a horizontal cross bar 85 disposed transversely across the frame and substantially above waist level.

The frame 55 includes a first motor mount 90, best shown in FIGS. 1, 2, and 3, mounted on the left-hand one of the posts 62 below the second transverse bar 66 at the side of this post toward the arch 80. The mount includes a pair of elongated, parallel upright channels 92 of box section, each having a vertical slot 93 opening toward the operator end. The channels are fixedly mounted in spaced relation on the post in any suitable manner in common vertical planes extended transversely of the frame. The upper ends of the channels are disposed above the transverse bar and their lower ends are disposed adjacent to the bars 63. Each channel is provided with a pair of vertically spaced clamps 95. Each clamp includes a nut slidably fitted within the channel and an axially horizontal cap screw 96 extending through the slot into screw-threaded engagement with the nut and having a head disposed outwardly of the slot. The motor mount has an upper angle member 98 extended transversely horizontally across the channels and having bores, not shown, through which the cap screws of the lower clamps extend. This member is provided with a pair of axially vertical adjustment bolts 101 having heads fixed to the angle and screw-threaded shanks extended downwardly therefrom in parallel, individually adjacent relation to the channels. The motor mount has a lower angle member 103 fixedly connected in any suitable manner to the channels and extended horizontally and transversely thereacross centrally between the transverse bar and the adjacent bars 63. The lower member has bores, not shown, through which the shanks extend and each shank is screw-threadably engaged oppositely of the member by a pair of adjustable nuts 105.

The frame 55 includes a second motor mount 110, best shown in FIGS. 3 and 4, mounted upwardly on the longitudinal bar 68 between the arch 80 and the transverse bar 66. The mount has a rectangular, lower horizontal plate 111 elongated in a direction along the longitudinal bar and fixed thereto in any suitable manner. The plate is provided with four axially upright, screw-threaded adjustment rods 113 individually adjacent to the corners of the plate and extended upwardly therefrom. The mount has a substantially square upper horizontal plate 114 disposed centrally of the lower plate and provided with ears 115 having bores, not shown, through which the adjustment rods extend. Each rod is provided with a pair of nuts 117 screw-threadably engaged therewith oppositely of the corresponding ear.

The machine 20 has a first motor unit 120 defining a first rotational axis 121 and mounted on the first motor mount 90 and with a second motor unit 122 defining a second rotational axis 123 and mounted on the second motor mount 110. The motor units are substantially identical and are of well-known constructon, each including a motor 125 having a rotationally driven shaft 126 extending horizontally and transversely of the frame 55 about the corresponding axis in a direction centrally of the frame to a point somewhat beyond its longitudinal center line. Each motor unit includes a base 128 which is substantially parallel to the corresponding axis and is substantially square and provided with bores, not shown, in each corner.

The base 128 of the first unit 120 is mounted on the channels 92 on the sides with the axis 121 spaced therefrom toward the operator end of the frame and disposed substantially at the elevation of the longitudinal bar 68.

The cap screws 96 of the base with the upper angle members 98 disposed oppositely of the base from the channels. Rotation of the upper of the nuts 105 on each bolt 101 with the cap screws somewhat loosened serves to adjust the elevational position of the motor unit and its axis, and tightening the lower of these nuts and the cap screws retains the unit and axis in a selected position.

The base 128 of the second motor unit 122 is fixedly mounted on the upper plate 114 by bolts 130 extended through the corresponding corners of the plate and the base. The second axis 123 is thus disposed upwardly of the first axis 121 and is spaced therefrom somewhat toward the operator end of the frame 55 for reasons subsequently to be explained. The elevation of the second axis is adjustable by loosening the four of the nuts 117 disposed upwardly of the ears 115 and rotating the other four of these nuts, and the axis is retained in a desired elevational position by re-tightening the upper nuts.

The motors 125 are electrically energized or deenergized simultaneously by actuation of an electrical switch 135 mounted on the right-hand end of the cross bar 85 of the arch 80 and disposed for actuation from the operator end of the frame 55. The motors are electrically connected through the switch in a well-known manner to any suitable source of electrical power so that their respective shafts revolve in the same rotational direction as indicated by the arrows 138, this direction being clockwise in FIG. 1 and counter-clockwise in FIG. 5.

The machine 20 includes a pair of elongated dorsal guides 150, best shown in FIGS. 1 through 4, extending parallel to the longitudinal bar 68 and having individual opposite ends 152. One end of each guide is disposed somewhat inwardly of the frame 55 from the bar 77 and the opposite end is disposed outwardly of the first bar 65. The guides are square tubes disposed equally oppositely of the longitudinal center line of the frame, the longitudinal axes of the guides being spaced from each other a distance substantially equal to the distance the dorsal areas 35 are spaced transversely of a carcass 25. The angular position of the guides about their longitudinal axes are such that a pair of their upwardly disposed individual sides converge downwardly and are inclined at an angle of approximately 35° to the horizontal. These sides thus provide a pair of planar first guide surfaces 155 which are individual to the guides and are upwardly disposed in facing relation transversely of the frame 55. The guides provide a pair of facing edges individual to the guides, and each has a downwardly disposed edge and an upwardly disposed edge. The facing edges are parallel and are spaced a distance somewhat greater than the width 31 of a backbone 30. The first surfaces are thus disposed so as individually to engage the areas 35 of a carcass 25 having its backbone downwardly disposed between the surfaces and extended longitudinally therealong with the carcass cradled on the surfaces. The downwardly disposed edges individually engage the upper sides of the transverse bars 65 and 66, and the upwardly disposed edges are disposed at an elevation somewhat below a point centered vertically between the axes 121 and 123.

The guides 150 are fixedly mounted on the frame 55 so as to be retained in their above-described attitude in relation to each other and the frame by a pair of brackets 160 individual to the bars 65 and 77. Each bracket has a horizontal angle member 162 extending parallel to the corresponding bar. The angle member is spaced below the guides in outwardly adjacent relation to the corresponding ends 152 thereof. Each bracket includes a pair of ears extended upwardly from the angle member to the corresponding ends of the guides. The ears are splayed outwardly and upwardly, as best shown in FIG. 2, from the member so as not to impair access to the surfaces 155 in a direction along the guides. The guides and brackets are unitarily constructed, as by welding, and are fixedly connected to the frame by a pair of bolt assemblies 165 individual to the brackets. These assemblies are disposed centrally between the guides and extend respectively through the bar 77 and a horizontal tab 166 welded to the bar 65.

Figure 5:
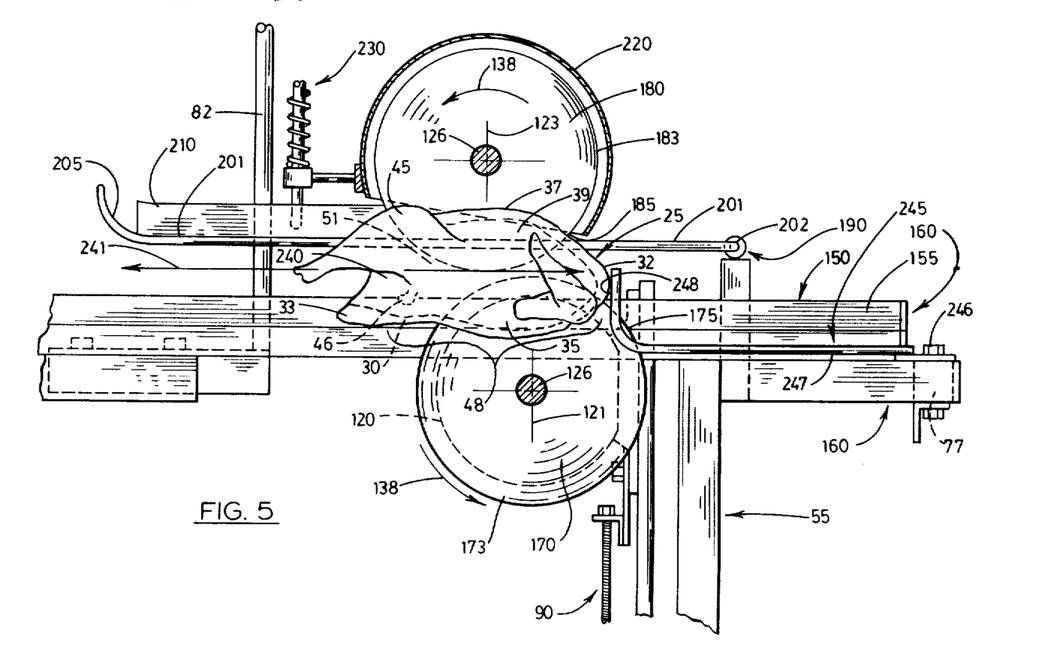
FIG. 5 is a fragmentary elevation of the machine together with a carcass taken from the position of line 5—5 of FIG. 2.
Figure 6:
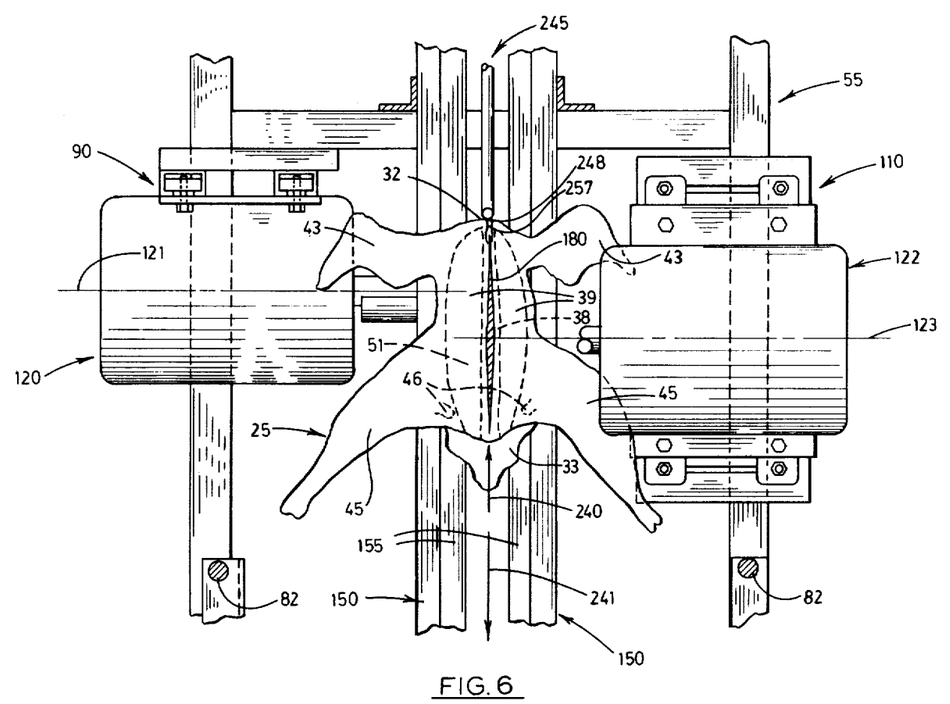
FIG. 6 is a fragmentary top plane view of the machine together with the carcass taken from the position of line 6—6 of FIG. 1.

The machine 20 includes a pair of first circular saws 170 coaxially mounted on the shaft 126 of the first motor unit 120 for rotation with the shaft about the first axis 121 in a pair of parallel vertical planes individual to the saws and parallel to the longitudinal axes of the dorsal guides 150. The saws are disposed between and adjacent to the facing edges of the guides. The saws are, therefore, disposed between the first guide surfaces 155 and are spaced axially a distance somewhat greater than the width 31 of a backbone 30. The saws are of a well-known type for cutting meat products and, as best shown in FIGS. 4 and 5, each has a circular cutting periphery 173 of a diameter such that the uppermost point of the periphery is centered elevationally between the first rotational axis and the second rotational axis 123. At any instant, the quadrant of each periphery which is disposed between this uppermost point and the axis and is disposed toward the operator end of the frame 55 defines a cutting edge 175 of the corresponding saw. The edge extends between the surfaces 155 and upwardly from the first axis in the corresponding plane. Since saws are of substantially equal diameter and are coaxially related, their cutting edges are substantially aligned transversely of the guides 150.

The machine 20 includes a single second circular saw 180, substantially identical to the saws 170, mounted on the shaft 126 of the second motor unit 122 for rotation with the shaft about the second axis 123 in a plane parallel to the planes of the first saws and centered therebetween. The single second saw has a circular cutting periphery 183 having a lowermost point disposed substantially at the same elevation as the uppermost point of the peripheries 173. The quadrant of the periphery of the single saw which, at any instant, is disposed below the second axis and toward the operator end of the frame 55 defines a cutting edge 185 of the saw extended downwardly of the second axis. Since the second axis is spaced from the first axis 121 along the guides 150 in a direction toward the operator end and since the first and second saws are substantially equal in diameter, the cutting edges 185 and 175 are correspondingly spaced.

As best shown in FIGS. 1 and 3, the machine 20 includes a pair of pivotal connectors 190 mounted on the side of the transverse bar 66 toward the bar 77. The connectors include individual posts 192 fixedly connected to the transverse bar oppositely of the dorsal guides 150. The posts terminate upwardly of the dorsal guides in individual horizontal cylindrical bushings 195 extended transversely of the frame 55 and spaced above the dorsal guide a distance approximately to the distance between a dorsal area 35 and the transversely corresponding ventral area 39 of a carcass 25. The bushings are aligned transversely of the frame about a common horizontal axis 197.

The machine 20 has a guide and cover assembly 200, best shown in FIGS. 1, 3, 4, and 5, mounted on the connectors 190 for pivotal movement about the axis 197 upwardly and downwardly in relation to the dorsal guides 150. The assembly is unitarily constructed, as by welding, and includes a pair of substantially identical, elongated, cylindrical rods 201. The rods extend generally horizontally from the bushings 195 individually above the transversely corresponding one of the dorsal guides. Each rod has a pivot end 202 which extends horizontally and transversely and is pivotally fitted into the corresponding bushing and secured therein by a pair of set collars 203 mounted on the pivot end oppositely of the bushing. Each rod has an upturned end 205 opposite the pivot end and disposed between the arch 80 and the operator end of the frame 55.

The assembly 200 includes a pair of generally planar, ventral guides 210 of elongated strip material. These guides are mounted individually and centrally on the rods 201. Each guide extends individually above and longitudinally along the transversely corresponding guide surface 155. Each guide has longitudinally opposite ends which are disposed oppositely of the cutting edges 175 and 185. One end is disposed toward the connectors 190 and the end is splayed outwardly and upwardly and is adjacent to the corresponding upturned end 205. Except for the splayed ends, the guides are planar and are inclined at an angle of approximately 45° so as to be upwardly convergent. The lower longitudinal edge of each guide engages the corresponding rod and extends therealong substantially radially from the axis 197. The downwardly facing sides of the guides thus provide individual, downwardly disposed second guide surfaces 215, best shown in FIGS. 4 and 7. These surfaces are upwardly convergent and are disposed in transversely facing relation to each other and in vertically facing relation individually to the first guide surfaces 155. The dimensions and proportions of the rods and the connectors 190 are such that, when the rods are approximately horizontal, the second surfaces are disposed individually to engage the ventral areas 39 of a carcass having its dorsal areas 35 cradled on the first guide surfaces. As best shown in FIG. 4, the second guide surfaces are thus disposed transversely oppositely of the cutting edge 185 and this edge extends between these surfaces from the axis 123.

From the foregoing description of the connectors 190 and the assembly 200, it is apparent that the connectors pivotally connect the frame 55 and the ventral guides 210 so that these guides are upwardly and downwardly pivotal about the axis 197 for elevational movement of the surfaces 215 toward and from the dorsal guides 150. Since this axis is at the ends of the guides opposite their splayed ends, these ends have substantially greater elevational movement than do the opposite ends when the ventral guides pivot about this axis.

The assembly 200 includes a saw cover 220 mounted upwardly on the ventral guides 210. The cover is a downwardly open cylindrical drum loosely fitted over the second saw 180 and disposed so as to be in approximate coaxial alignment therewith when the rods 201 are horizontal. The ends of the drum have identical lower edges 222 conforming to and engaging the upper sides of the ventral guides. These edges are disposed in convergent, upwardly inclined relation in a direction toward the operator end of the frame 55. These edges are fixedly connected to the guides, as by welding, so that the cover rigidly interconnects the guides and the assembly pivots as a unit about the axis 197. The cover is provided with a shield 224 fixedly connected thereto and extended over the one of the shafts 126 corresponding to the motor unit 122.

The machine 20 has a spring assembly 230, best shown in FIGS. 1 and 2, which connects the arch 80 and the guide and cover assembly 200 and serves to urge the latter assembly downwardly about the axis 197. The spring assembly includes a pair of upright rods 232 having lower ends fixed individually to the ventral guides 210 and upper portions extended past the cross bar 85 in closely adjacent relation thereto. The lower end portion of each rod is rigidly interconnected to the cover 220 by a brace 233. The upper portion of each rod is encircled by a slide collar 235 which is fixedly mounted on the cross bar and loosely fitted to the rod so as not to interfere with vertical movement of the rod. Each rod has a stop collar 236 having a set screw by which the stop collar is releasably secured on the rod above the slide collar. The stop collars are positioned along the rod so as to engage the corresponding slide collars when the rods 201 pivot about the axis 197 to a disposition somewhat below the horizontal. The spring assembly has a pair of helical compression springs 238 individually fitted coaxially about the upright rods between the corresponding bracket and the slide collar. The springs thus resiliently urge the guide and cover assembly to pivot downwardly until further movement is arrested by engagement of the stop collar and the slide collars. The springs exert only sufficient resilient force to ensure that the ventral guides slidably engage a carcass 25 cradled on the dorsal guides 150, as previously described.

Considering the relative positions of dorsal guides 150 and the ventral guides 210, as best shown in FIG. 4, it is seen that the first guide surfaces 155 and the second guide surfaces 215 face each other in a lozenge-shaped configuration and define a path of travel indicated by the arrows 240 and 241 in FIGS. 1, 3, 5, 6, and 7 for a carcass 25 cradled between the first surfaces as previously described. The arrows 240 indicate a direction along the path from the operator end of the frame 55 toward the saws 170 and 180, and the arrows 241 indicate the reverse direction along the path. It is apparent that the respective cutting edges 175 of the pair of saws are spaced in the first direction from the cutting edge 185 of the single saw. The path extends longitudinally of the backbone 30 of the carcass and extends centrally between and along facing pairs of the surfaces so that each of these pairs are disposed on opposite sides of the path, are parallel to it, and converge in a direction away from the path. In particular, the first guide surfaces converge downwardly away from the path and the second guide surfaces converge upwardly therefrom. With the carcass disposed as just described in relation to the path, the carcass is guided therealong by the surfaces with the breast 37 disposed in a direction substantially vertically from the backbone, the carcass being retained between the guides by the force exerted by the springs 238. It is also seen that the respective axes 121 and 123 of the saws 170 and 180 are disposed oppositely of the adjacent pair of the guide surfaces, 155 or 215, from the other of these surfaces; that the respective planes in which the saws rotate are parallel to the path; that the cutting edges 175 and 185 extend into the path to a point which is disposed centrally elevationally between each facing pair of the transversely corresponding first and second guide surfaces; and that this point is disposed centrally of the lozenge-shaped configuration.

The machine 20 has a neck stop 245, best shown in FIGS. 2, 3, 5, and 6, transversely centered between the dorsal guides 150 and having a mounting tab 246 fixedly secured to the bar 77 by the corresponding one of the bolt assemblies 165. The stop has an elongated stem 247 extending somewhat upwardly from the tab and longitudinally of the frame and toward the operator end of the frame 55 to a blocking surface 248 disposed in the path indicated by the arrows 240 and 241. This surface is, therefore, disposed centrally between the guide surfaces 155 and 215 so as to engage the neck end 32 of a carcass 25 moved along the path in the direction indicated by the arrow 240 with this end leading. The blocking surface is spaced in the direction along the path indicated by this arrow from the cutting edges 175 and 185 a distance somewhat less than the predetermined distance 48.

OPERATION

The operation of the described embodiment of the present invention is believed to be clearly apparent and is briefly summarized at this point.

Prior to using the machine 20, the elevational positions of the pair of saws 170 and the single saw 180 are adjusted so as to bring the cutting edges 175 and 185 into their previously described positions relative to each other and to the guides 150 and 210. Any necessary elevational movement of the pair of saws in relation to the dorsal guides is obtained by loosening the cap screws 96 and the lower pair of the nuts 105, rotating the upper pair of these nuts to position the motor unit 120, and then tightening the cap screws and the lower pair of nuts to clamp the unit in position. The single saw is elevationally positioned as required in relation to the pair of saws and the dorsal guides by loosening the lower four of the nuts 117, rotating the upper four of these nuts to raise or lower the second motor unit 122, and then clamping the motor unit in position by re-tightening the lower four nuts. Finally, the position of the stop collars 236 along the rods 232 is adjusted so that the upturned ends of the ventral guides remain spaced substantially from the dorsal guides when no carcass 25 is present between the guides. It is thus apparent that by making suitable elevational adjustments in the manner just described, the machine is adapted for use with batches of carcasses differing in the spacing of their dorsal areas 35 and ventral areas 39. When these adjustments are completed, the motors 125 are energized with the switch 135 so that the saws are rotationally driven in the directions indicated by the arrows 138. The machine is then ready for use.

In using the machine 20, an operator faces the operator end of the frame 55. The thighs 45 of a carcass 25 are then grasped individually by the hands of the operator, as indicated by the numeral 253 in FIG. 3, with the breast 37 upwardly disposed and the neck end 32 disposed in the direction 240 from the thighs, and toward the saws 170 and 180. The carcass is next placed on the guide surfaces 155 toward the ends 152 of the dorsal guides 150 adjacent to the operator and is then manually urged toward the saws and inserted between the dorsal guides and the ventral guides 210 so that the surfaces 215 also engage the carcass. This insertion is facilitated by the upturned ends of the rods 201 and the splayed ends of the ventral guides which guide the carcass beneath the ventral guides, camming the guides and the balance of the assembly 200 upwardly in pivotal movement about the axis 197 against the resilient urging of the springs 238 into a position 250 depicted in dash lines in FIG. 1. This elevationally pivotal movement facilitates reception of the carcass in the previously described cradled relation on the dorsal guides and accommodates carcasses of different thicknesses between their respective dorsal areas 35 and ventral areas 39, allowing such carcasses to be fully engaged simultaneously between the guide surfaces 155 and 215.

When the carcass 25 is inserted between the guides 150 and 210 with the thighs 45 grasped as indicated by the numeral 253, the carcass is manually urged to move in the direction indicated by the arrow 240 with the neck end 32 forwardly disposed and with the carcass guided by the surfaces 155 and 215. This movement is continued until the neck end engages the blocking surface 248, preventing further movement in this direction. At this point, the position of the carcass in relation to the pair of saws 170 and the single saw 180 and in relation to their respective planes and cutting edges 175 and 185 is best shown in FIGS. 4 through 7. It is seen that the pair of saws made a pair of first cuts 255 parallel to the path and longitudinally parallel to the backbone 30. These cuts lie in the planes which are parallel to the path. It will be noted that these cuts are also parallel to the direction the breast is disposed from the backbone since the breast 37 is disposed upwardly of the backbone toward the axis 121. As the carcass moves in the direction 240, the first cuts are made in oppositely adjacent relation to the backbone through the rib cage 41 at each side of the backbone. Due to the previously described spacing of the blocking surface from the cutting edges 175, when the neck end engages this surface, these edges are disposed posteriorly of the rib cage and anteriorly of the thighs. The rib cage is thus entirely severed from the backbone while the thighs remain attached to the backbone. Since, as best shown in FIG. 4, the cavity 51 is disposed between the dorsal areas 35 and ventral areas 39 and the first cutting edges terminate centrally between the guide surfaces 155 and 215 which are engaged, respectively, with these areas, the first cuts extend inwardly of the carcass through the rib cage and terminate within this cavity substantially short of the breast.

As the carcass 25 moves in the direction 240 and the pair of saws 170 make the first cuts 255, the single saw 180 makes a second cut 257 centrally and longitudinally of the breast 37. Since the cutting edge 185 of the single saw is spaced farther from the blocking surface 248 than the edges of the pair of saws, the edge of the single saw passes from the neck end 32 to a point posteriorly from the breast as the carcass approaches this surface. As a result, the second cut extends completely through the breast, splitting it. It is apparent that the blocking surface thus blocks movement of the carcass in the direction 240 subsequent to splitting of the breast by the single saw. Further, since this edge terminates, similarly to the edges 175, centrally between the guide surfaces 155 and 215 and centrally of the cavity 51, the second cut terminates short of the backbone 30. It will be noted that the splitting of the breast is completed immediately prior to engagement of the thigh joints 46 with the first edges. As a result, the cuts 255 and 257 are completed at substantially the same instant and no further movement of the carcass in the direction 240 along the path is required to make one cut after the others are completed.

When the carcass 25 engages the surface 248 and the cuts 255 and 257 are complete, the carcass is then, without releasing the grasp on the thighs 45 indicated by the numeral 253, manually urged in the direction 241 and withdrawn from between the guides 150 and 210. The carcass is then deposited in any suitable container, not shown, within convenient reach of the operator and another carcass 25 grasped and disposed in the machine for making the cuts 255 and 257.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. A poultry cutting machine for use with a poultry carcass having a generally lozenge-shaped transverse cross section; a pair of transversely opposite dorsal exterior areas; an elongated backbone extending longitudinally of the carcass along one corner of the cross section between the dorsal areas; a breast disposed at the corner of the cross section opposite the backbone; and a pair of ventral exterior areas borne on the breast transversely oppositely thereof and spaced from the dorsal areas, the carcass being moved in a predetermined path of travel longitudinally of the backbone, the machine comprising:
  A. a frame;
  B. a pair of dorsal guides mounted on the frame at one side of the path of travel and bearing individual first planar surfaces parallel to the path and convergent in a direction away from the path, the first surfaces being disposed individually to engage the dorsal areas oppositely of the backbone and adjacent thereto and as the carcass moves along the path;
  C. a pair of ventral guides mounted on the frame oppositely of the path of travel from the dorsal guides and bearing individual second planar surfaces parallel to the path and convergent in a direction away from the path, the second surfaces being disposed in individually facing relation to the first surfaces and spaced therefrom so as individually to engage the ventral areas as the carcass moves along the path;
  D. a pair of coaxially related circular saws mounted on the frame for rotation about a first axis disposed oppositely of said first surfaces from said second surfaces, the saws being disposed in individual planes extending parallel to the path in a direction between the dorsal guides and the ventral guides and having individual peripheral cutting edges extending between the first surfaces from said axis to a point disposed in the path centrally of the facing surfaces to cut the carcass oppositely along the backbone and adjacent thereto as the carcass is moved along the path;
  E. a single circular saw mounted on the frame for rotation about a second axis disposed oppositely of the second surfaces from the first surfaces in a plane parallel to said planes and disposed centrally therebetween, the single saw including a peripheral cutting edge extending between the second surfaces from the second axis to a point disposed in the path centrally of the facing surfaces to split the breast as the carcass is moved along the path; and
  F. means for rotationally driving the single saw and the pair of saws about their respective axes.

2. The machine of claim 1 wherein, longitudinally of the backbone, the carcass terminates at a neck end, the breast being adjacent thereto and extending a predetermined distance therefrom; wherein the carcass has a pair of transversely opposite thigh joints spaced approximately said predetermined distance from said end; wherein the carcass is moved along said path in a predetermined direction with the neck end leading to split the breast and to cut the carcass adjacent to the backbone; and wherein said edges of the pair of saws are spaced in said predetermined direction from said edge of the single saw so that, as the carcass is moved in said direction, the breast is split completely by the single saw immediately prior to engagement of the thigh joints with the corresponding edges of the pair of saws.

3. The machine of claim 2 further comprising a neck stop mounted on the frame and disposed in the path centrally of the facing surfaces, the stop having a blocking surface adapted to engage the neck end in blocking relation thereto and spaced in said predetermined direction from the edges of the pair of saws a distance somewhat less than said predetermined distance, so that the blocking surface blocks movement of the carcass in said predetermined direction subsequent to said splitting of the breast by the edge of the single saw and prior to engagement of either thigh joint with an edge of the pair of saws.

4. The machine of claim 1 wherein the dorsal guides are fixedly mounted on the frame with the first surfaces upwardly disposed for reception of a carcass cradled thereon with the backbone downwardly disposed between said surfaces, the machine further comprising:
  A. means mounting the ventral guides with the second surfaces downwardly disposed for elevational movement toward and from the dorsal guides, and
  B. means for urging the ventral guides toward the dorsal guides so as to engage a carcass cradled thereon between the facing surfaces with a force sufficient to retain the carcass between the guides for guidance by the surfaces along the path.

5. The machine of claim 4 wherein the carcass is moved in a predetermined direction along the path to split the breast and cut the carcass adjacent to the backbone; wherein the ventral guides are rigidly connected and have individual opposite ends which are disposed along the path oppositely of the respective edges of the pair of saws and of the single saw; and wherein said means for mounting the ventral guides includes a pivotal connector between the frame and said guides, the connector defining a horizontal axis extending transversely of the path at said ends which are disposed in said predetermined direction from said edges, so that said ends opposite said edges from said axis are upwardly and downwardly pivotal thereabout to facilitate reception of a carcass on the dorsal guides and to accommodate carcasses of different thicknesses between the dorsal areas and the ventral areas.

6. A poultry cutting machine for use with a picked and eviscerated poultry carcass having a dorsal side including a backbone, a ventral side including a breast and a rib cage interconnecting the backbone and the breast, comprising:
  A. a pair of spaced, elongated, transversely downwardly convergent dorsal guides adapted to receive the carcass cradled therein with its backbone downwardly disposed and extended longitudinally of the dorsal guides along the space therebetween;

B. a pair of spaced, elongated, transversely downwardly divergent ventral guides disposed above the dorsal guides and extended therealong;

C. means mounting the ventral guides for floating movement rested downwardly on the carcass when it is cradled in the dorsal guides;

D. a pair of parallel circular dorsal saws extended upwardly through the space between the dorsal guides adapted to cut the dorsal side of the carcass on opposite sides of the backbone to sever the backbone from the rib cage; and E. a ventral circular saw extended downwardly between the ventral guides substantially parallel to the dorsal saws having a periphery disposed between the peripheries of the dorsal saws adapted to cut the ventral side of the carcass between the cuts by the dorsal saw on opposite sides of the backbone to split the breast.

* * * * *